| United States Patent [19] | [11] Patent Number: 4,770,422 |
| Isaac | [45] Date of Patent: *Sep. 13, 1988 |

[54] COMPOSITION FOR MAKING DURABLE GOLF BALLS AND OTHER PRODUCTS

[75] Inventor: Sharon R. Isaac, Acushnet, Mass.

[73] Assignee: Acushnet Company, New Bedford, Mass.

[ * ] Notice: The portion of the term of this patent subsequent to Oct. 15, 2002 has been disclaimed.

[21] Appl. No.: 794,164

[22] Filed: Nov. 1, 1985

[51] Int. Cl.$^4$ .......... C08L 9/00; C08L 35/02; A63B 37/00; A63B 37/02

[52] U.S. Cl. .......... 273/218; 273/228; 273/230; 273/235 R; 525/263; 525/265; 525/274; 524/908; 524/533

[58] Field of Search .......... 525/274, 263, 265, 193, 525/195, 196; 524/908; 273/218, 228, 230, 235 R

[56] References Cited

U.S. PATENT DOCUMENTS

| 4,264,075 | 4/1981 | Miller et al. | 525/274 |
| 4,266,772 | 5/1981 | Martin et al. | 525/274 |
| 4,500,466 | 2/1965 | Hayes et al. | 525/274 |
| 4,546,980 | 10/1985 | Gendreau et al. | 525/274 |
| 4,561,657 | 12/1985 | Tominaga et al. | 524/908 |

FOREIGN PATENT DOCUMENTS

| 1430843 | 4/1976 | United Kingdom . | |
| 1520254 | 8/1978 | United Kingdom . | |
| 2104529 | 3/1983 | United Kingdom | 525/274 |
| 417437 | 8/1974 | U.S.S.R. | 525/274 |

Primary Examiner—Allan M. Lieberman
Attorney, Agent, or Firm—Lucas & Just

[57] ABSTRACT

A composition for making golf ball products is disclosed. Polybutadiene is crosslinked by zinc diacrylate with the use of a free radical initiator, such as a peroxide. The amount of free radical initiator used is between 0.2 parts and 0.8 parts per 100 parts polybutadiene. The amount of zinc diacrylate and free radical initiator are controlled and the curing conditions adjusted so that the golf ball product has a swell index of at least about 0.6 and a PGA compression of about 50-110.

65 Claims, No Drawings

COMPOSITION FOR MAKING DURABLE GOLF BALLS AND OTHER PRODUCTS

The present invention relates to golf balls and in particular to a composition for making durable solid golf ball products which still have good playing characteristics such as good initial velocity.

As used in the industry, the term "solid golf balls" refers to balls which do not have windings, i.e. they are either unitary, one piece golf balls or are multiple piece golf balls, e.g. with a solid unitary core and a separate cover.

For many years golf balls were made by winding a very long elastic thread about a center, which was either a solid or a liquid-filled balloon, and then molding a cover, notably of balata, thereabout. This is both a laborious and time consuming process and involves substantial expense. Because of this, manufacturers have been continually trying to reduce the complexity and cost of making a golf ball.

In the 60's it was thought that this had been accomplished with the inventions of James R. Bartsch, whose inventions are set forth in U.S. Pats. Nos. 3,438,933 and 3,313,545. The Bartsch patents teach a polymer backbone crosslinked by one or more organic monomers and these chemical compositions certainly had the greatest promise to that time of making a one piece solid golf ball. Many manufacturers spent millions of dollars trying to develop a successful commercial golf ball utilizing the Bartsch technology. While some golf balls did reach the marketplace, they were almost universally condemned because of their poor performance, particularly in terms of low initial velocity. By the early 70's, golf balls of this type had virtually, if not completely, disappeared from the marketplace except for unique situations such as golf driving ranges where poor initial velocity is considered desirable by the operator since it makes it less likely that golf balls will be hit so far that they are lost.

In the early 70's it was discovered that golf balls could be made by crosslinking polymers, typically polybutadiene, with metal salts of unsaturated carboxylic acids, notably zinc diacrylate or zinc dimethacrylate, and that such compositions were substantially better than the Bartsch composition in terms of golf ball properties such as initial velocity, rebound and the like. Balls made with zinc diacrylate as the crosslinker have higher initial velocity than those made with zinc dimethacrylate. However, balls made with zinc diacrylate as the crosslinker lacked the important element of durability. In boxing terms, they were similar to a fighter with a "glass jaw", i.e. if they were hit hard enough, they would fall apart. A number of manufacturers saw the advantage of using this technology, however, and toughened up the golf ball by putting on a cover of Surlyn resin, an ionomer made by duPont. While these balls were quite good, they lacked the advantage of being capable of producing one piece balls. Additionally, even as two piece solid balls, there was a tendency for the core to crack, especially where the polymer was polybutadiene cross-linked by a zinc diacrylate.

In the manufacture of golf ball products by crosslinking of a polymer such as polybutadiene with a metal salt of an unsaturated carboxylic acid such as zinc diacrylate or zinc dimethacrylate, as a practical matter it is necessary to include a free radical initiator to promote the reaction. The free radical initiator is generally used in the amount of 2–7% by weight of the polymer material.

The applicants have now discovered that an improved golf ball product comprising polybutadiene crosslinked by zinc diacrylate can be made if the amount of free radical initiator is substantially below that typically used in the past. The golf ball product is characterized by excellent durability as well as good initial velocity.

In accordance with the present invention the total amount of free radical initiator used in making a golf ball product is from about 0.2% to about 0.8% by weight of the polybutadiene. It is preferred to use about 0.2% to 0.5% since this results in a golf ball product with good compression and it is most preferred to use about 0.2%.

The term free radical initiator as used herein refers to a chemical which, when added to an admixture of polybutadiene and a metal salt of an unsaturated carboxylic acid, promotes the crosslinking of the polybutadiene by the metal salt of the unsaturated carboxylic acid. Typical of these free radical initiators are peroxides such a dicumyl peroxide.

The term golf ball product is generic and includes unitary golf balls, cores of two piece golf balls, centers of wound golf balls and the like. The present invention may be used to form a unitary golf ball or a two or more part golf ball if desired. The composition of the present invention may be used for either the core or the shell cover of a two piece ball but best results are obtained when the composition of the present invention is used as the core with a standard cover such as of Surlyn ionomer resin.

The preferred free radical initiators are peroxides. Suitable peroxides are dicumyl peroxide, 1,1-di-(t-butylperoxy)-3,3,5-trimethyl cyclohexane, t-butyl perbenzoate, n-butyl-4,4-bis-(t-butylperoxy) valerate, 1,1-di(t-butylperoxy) cyclohexane, ethyl-3,3-di(t-butylperoxy) buterate, $\alpha,\alpha'$-bis-(t-butylperoxy)diisopropyl benzene, and t-butylcumyl peroxide.

A typical base composition in accordance with the present invention comprises polybutadiene and, in parts by weight based on 100 parts polybutadiene, 25–40 parts zinc diacrylate as a crosslinker and 0.2 to 0.8 parts of a free radical initiator. Up to 40 parts by weight zinc oxide or other inert filler to adjust weight is preferably also included. The polybutadiene preferably has a cis 1,4 content above about 40% and more preferably above about 90%.

In one typical way of forming a composition according to the present invention, the polybutadiene and zinc diacrylate are mixed together. When the components are initially mixed together the temperature of the mixture rises. The mixing is contained until a good dispersion is achieved as indicated by reaching a temperature of about 225° to 325° F. This is generally about 3 to 30 minutes. Once the mixing is complete the admixture is cooled to a temperature below the decomposition temperature of the free radical initiator. The initiator is added to the mixture, and the mixture is again mixed for about 3 to 15 minutes. The mass is then suitably milled into slabs or extruded into rods from which pieces are cut slightly larger and heavier than the desired golf ball product. These pieces are placed in a heated golf ball product mold such as a ball cup mold or a ball core mold and cured at elevated temperature under pressure. A temperature of about 280° F. to 340° F. for a period of about 15 to 30 minutes has been found to be suitable.

The pressure is not critical so long as it is sufficient to prevent the mold from opening during heating and curing.

Controlling the amount of the free radical initiator does not, of itself, necessarily make a good golf ball product. The golf ball product should have a suitable compression, typically from about 50 to about 110. Compression as used herein refers to PGA compression and is a well-known value in the golf ball industry. The golf ball should also not be over crosslinked. The method for determining whether or not there is over cross-linking is to measure the swell index. The swell index should be at least about 0.6 and is preferably above about 0.8. Swell index is measured by taking a weighed sample of the golf ball product, immersing it in toluene under ambient conditions for four days and then calculating the swell index according to the following formula:

$$\frac{\text{final weight} - \text{initial weight}}{\text{initial weight}} = \text{swell index}$$

In addition to the amount of free radical initiator and the amount of zinc diacrylate, the temperature of cure and the time of cure will also have an effect upon both the PGA compression and the swell index.

These and other aspects of the present invention may be more fully understood with reference to the following examples.

In the examples polybutadiene having a cis-1,4 polybutadiene content in excess of 90% was used. For each 100 parts of polybutadiene, 30 parts by weight of zinc diacrylate was used and 24 parts by weight of zinc oxide was included as a filler. Except where indicated, the free radical initiator in each case was α,α'-bis-(t-butylperoxy)diisopropyl benzene. The amount of free radical initiator is based on parts by weight per 100 parts by weight of polybutadiene.

EXAMPLE 1

A core of a two piece golf ball was made by curing the base composition with 1.1 parts free radical initiator at 320° F. for 20 minutes. The cores had a PGA compression of 98 and a swell index of about 0.3. The resulting cores were tested for durability by hitting them 50 times with an implement travelling at about 125 feet per second. Severe cracking of the cores occurred.

EXAMPLE 2

Example 1 was repeated except that in this instance the amount of free radical initiator was reduced to 0.2 parts. The resulting cores had a PGA compression of 68 and a swell index above 0.6. In the durability test, no cracking occurred.

EXAMPLE 3

Example 1 was repeated using 0.5 parts free radical initiator and a cure temperature of 300° F. The resulting golf balls had a PGA compression of 85 and a swell index of about 0.6. None of the balls cracked in the durability test.

EXAMPLE 4

Example 1 was repeated using 1.4 parts free radical initiator. The resulting cores had a PGA compression of 100 and a swell index of below 0.3. In the durability test, the cores exhibited severe cracking.

EXAMPLE 5

Example 1 was repeated except that the amount of free radical initiator was 0.2 parts and the cure temperature was 280° F. While the swell index was above 0.6 and the cores showed no cracking in the durability test, the cores were not considered suitable for use as a golf ball product because the PGA compression was 0.

EXAMPLE 6

Example 5 was repeated with the amount of free radical initiator being increased to 0.5 parts. In this case a core was obtained which had a swell index above 0.6, a PGA compression of 77 and the cores exhibited no cracking in the durability test.

EXAMPLE 7

Example 1 was repeated using 0.8 parts free radical initiator and a cure temperature of 300° F. The resulting cores had a swell index above 0.6 and a PGA compression of 94. In the durability test, no cracking of the cores occurred.

EXAMPLE 8

Examples 1–7 are repeated except that the free radical initiator employed is dicumyl peroxide. Comparable results are obtained.

EXAMPLE 9

Examples 1–7 are repeated except that one piece solid golf balls are made rather than golf ball cores. Comparable results are obtained.

EXAMPLE 10

The cores made in Examples 1–7 are enclosed in a golf ball cover. The golf ball cover is composed of Surlyn resin, a duPont trademark for an ionomer consisting of a copolymer of ethylene and methacrylic acid partially crosslinked by metal ions. The specific resin used is a combination of Surlyn 1702, Surlyn 1706 and Surlyn 1707 as set forth in U.S. Pat. No. 4,323,427. Acceptable golf balls are obtained in each instance except with the core of Example 5. However in the durability tests, golf balls made with cores of Examples 2, 3, 6 and 7 are found to be far more durable than golf balls made with cores of Examples 1 and 4. While there is a measurable PGA compression with the golf ball with the core of Example 5, it is found to be well below the 50 minimum necessary to have an acceptable golf ball.

It will be understood that the claims are intended to cover all changes and modifications of the preferred embodiments of the invention, herein chosen for the purpose of illustration, which do not constitute departure from the spirit and scope of the invention.

What is claimed is:

1. In the manufacture of a golf ball product by cross-linking polybutadiene with about 25 to 40 parts zinc diacrylate by weight per 100 parts by weight polybutadiene, the improvement comprising the use of about 0.2 to 0.8 parts by weight per 100 parts by weight polybutadiene of peroxide free radical initiator.

2. The manufacture of a golf ball product according to claim 1 wherein the free radical initiator is present in the amount of about 0.2 to 0.5 parts.

3. The manufacture of a golf ball product according to claim 1 wherein the free radical initiator is present in the amount of about 0.2 parts.

4. The manufacture of a golf ball product according to claim 1 wherein the golf ball product is the core of a two piece golf ball.

5. The manufacture of a golf ball product according to claim 4 wherein the cover of the two piece golf ball is composed of one or more ionomer resins.

6. The manufacture of a golf ball product according to claim 1 wherein the golf ball product is a one piece solid golf ball.

7. A method of making a golf ball product comprising admixing polybutadiene and, per 100 parts by weight polybutadiene, 30–40 parts by weight zinc diacrylate together with 0.2 to 0.8 parts by weight per 100 parts of polybutadiene of peroxide free radical initiator and curing the same at a temperature from about 280° F. to 320° F. for a period of about 15–30 minutes, the amount of zinc diacrylate and of free radical initiator and the temperature and time of cure being selected to yield a golf ball having a PGA compression of about 50–110 and a swell index of above about 0.6.

8. The method of claim 7 wherein the said swell index is above about 0.8.

9. The method of claim 7 wherein the amount of free radical initiator is from about 0.2 to 0.8 parts.

10. The method of claim 9 wherein the amount of zinc diacrylate is about 30 parts and the amount of free radical initiator is about 0.2 parts.

11. The method of claim 7 wherein the golf ball product is the core of a two piece golf ball.

12. The method of claim 7 wherein the golf ball product is a one piece solid golf ball.

13. The manufacture of a golf ball product according to claim 1 wherein the free radical initiator is selected from the group consisting of $\alpha,\alpha'$-bis-(t-butylperoxy)-diisopropyl benzene and dicumyl peroxide.

14. The manufacture of a golf ball product according to claim 2 wherein the free radical initiator is selected from the group consisting of $\alpha,\alpha'$-bis-(t-butylperoxy)-diisopropyl benzene and dicumyl peroxide.

15. The manufacture of a golf ball product according to claim 3 wherein the free radical initiator is selected from the group consisting of $\alpha,\alpha'$-bis-(t-butylperoxy)-diisopropyl benzene and dicumyl peroxide.

16. The method of claim 7 wherein the free radical initiator is selected from the group consisting of $\alpha,\alpha'$-bis-(t-butylperoxy)diisopropyl benzene and dicumyl peroxide.

17. The method of claim 9 wherein the free radical initiator is selected from the group consisting of $\alpha,\alpha'$-bis-(t-butylperoxy)diisopropyl benzene and dicumyl peroxide.

18. The method of claim 10 wherein the free radical initiator is selected from the group consisting of $\alpha,\alpha'$-bis-(t-butylperoxy)diisopropyl benzene and dicumyl peroxide.

19. The method of claim 7 wherein the amount of free radical initiator is from about 0.2 to about 0.5 parts.

20. The method of claim 19 wherein the free radical initiator is selected from the group consisting of $\alpha,\alpha'$-bis-(t-butylperoxy)diisopropyl benzene and dicumyl peroxide.

21. A golf ball product made by the method of claim 7.

22. A golf ball product made by the method of claim 8.

23. A golf ball product made by the method of claim 10.

24. A golf ball product made by the method of claim 11.

25. A golf ball product made by the method of claim 16.

26. A golf ball product made by the method of claim 18.

27. A golf ball product made by the method of claim 9.

28. A golf ball product made by the method of claim 20.

29. A method of making a product comprising admixing polybutadiene and, per 100 parts by weight polybutadiene, 30–40 parts by weight zinc diacrylate together with 0.2 to 0.8 parts by weight per 100 parts of polybutadiene of peroxide free radical initiator and curing the same at a temperature from about 280° F. to 320° F. for a period of about 15–30 minutes, the amount of zinc diacrylate and of free radical initiator and the temperature and time of cure being selected to yield a product having a swell index of above about 0 6.

30. The method of claim 29 wherein the said swell index is above about 0.8.

31. The method of claim 29 wherein the amount of free radical initiator is from about 0.2 to 0.8 parts.

32. The method of claim 29 wherein the amount of free radical initiator is from about 0.2 to about 0.5 parts.

33. The method of claim 31 wherein the amount of zinc diacrylate is about 30 parts and the amount of free radical initiator is about 0.2 parts.

34. The method of claim 29 wherein the free radical initiator is selected from the group consisting of $\alpha,\alpha'$-bis-(t-butylperoxy)diisopropyl benzene and dicumyl peroxide.

35. The method of claim 31 wherein the free radical initiator is selected from the group consisting of $\alpha,\alpha'$-bis-(t-butyperoxy)diisopropyl benzene and dicumyl peroxide.

36. The method of claim 32 wherein the free radical initiator is selected from the group consisting of $\alpha,\alpha'$-bis-(t-butylperoxy)diisopropyl benzene and dicumyl peroxide.

37. The method of claim 33 wherein the free radical initiator is selected from the group consisting of $\alpha,\alpha'$-bis-(t-butylperoxy)diisopropyl benzene and dicumyl peroxide.

38. A product made by the method of claim 29.
39. A product made by the method of claim 30.
40. A product made by the method of claim 32.
41. A product made by the method of claim 33.
42. A product made by the method of claim 34.
43. A product made by the method of claim 36.
44. A product made by the method of claim 37.
45. A golf ball product manufactured according to claim 1.
46. A golf ball product manufactured according to claim 2.
47. A golf ball product manufactured according to claim 3.
48. A golf ball product manufactured according to claim 4.
49. A golf ball product manufactured according to claim 5.
50. A golf ball product manufactured according to claim 6.
51. A golf ball product manufactured according to claim 13.
52. A golf ball product manufactured according to claim 14.

53. A golf ball product manufactured according to claim 15.

54. In the manufacture of a product by crosslinking polybutadiene with about 25 to 40 parts zinc diacrylate by weight per 100 parts by weight polybutadiene, the improvement comprising the use of about 0.2 to 0.8 parts by weight per 100 parts by weight polybutadiene of peroxide free radical initiator.

55. The manufacture of a product according to claim 54 wherein the free radical initiator is present in the amount of about 0.2 to 0.5 parts.

56. The manufacture of a product according to claim 54 wherein the free radical initiator is present in the amount of about 0.2 parts.

57. The manufacture of a product according to claim 54 wherein the free radical initiator is selected from the group consisting of $\alpha,\alpha'$-bis-(t-butylperoxy)diisopropyl benzene and dicumyl peroxide.

58. The manufacture of a product according to claim 55 wherein the free radical initiator is selected from the group consisting of $\alpha,\alpha'$-bis-(t-butylperoxy)diisopropyl benzene and dicumyl peroxide.

59. The manufacture of a product according to claim 56 wherein the free radical initiator is selected from the group consisting of $\alpha,\alpha'$-bis-(t-butylperoxy)diisopropyl benzene and dicumyl peroxide.

60. A product manufactured according to claim 54.
61. A product manufactured according to claim 55.
62. A product manufactured according to claim 56.
63. A product manufactured according to claim 57.
64. A product manufactured according to claim 58.
65. A product manufactured according to claim 59.

* * * * *

UNITED STATES PATENT AND TRADEMARK OFFICE
CERTIFICATE OF CORRECTION

PATENT NO. : 4,770,422

DATED : September 13, 1988

INVENTOR(S) : Sharon R. Isaac

It is certified that error appears in the above-identified patent and that said Letters Patent are hereby corrected as shown below:

Column 6, line 8, change the dependency of the claim from "claim 9" to --claim 19--.

Signed and Sealed this

Twenty-first Day of February, 1989

Attest:

DONALD J. QUIGG

*Attesting Officer*   *Commissioner of Patents and Trademarks*